United States Patent
Igarashi

(10) Patent No.: US 6,213,179 B1
(45) Date of Patent: Apr. 10, 2001

(54) RUN-FLAT TIRE SYSTEM FOR MOTORCYCLES

(75) Inventor: Yasuo Igarashi, Kawanishi (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/136,405

(22) Filed: Aug. 19, 1998

(30) Foreign Application Priority Data

Aug. 19, 1997 (JP) .................................................. 9-222443

(51) Int. Cl.$^7$ ............................ B60C 17/04; B60C 17/06
(52) U.S. Cl. .......................................... 152/158; 152/520
(58) Field of Search .................................. 152/157, 158, 152/520, 203, 204

(56) References Cited

U.S. PATENT DOCUMENTS

| | | |
|---|---|---|
| 1,638,370 | 8/1927 | Small . |
| 1,714,710 | 5/1929 | Dalbey . |
| 5,685,925 | * 11/1997 | Riquier et al. .................. 152/157 |

FOREIGN PATENT DOCUMENTS

| | | |
|---|---|---|
| 2104457 | 3/1983 | (GB) . |
| 3-231008 | 10/1991 | (JP) . |
| 3-292206 | 12/1991 | (JP) . |
| 8-164719 | 6/1996 | (JP) . |
| 08164719 | 10/1996 | (JP) . |
| 08332805 | 4/1997 | (JP) . |
| 40689 | 12/1961 | (LU) . |

* cited by examiner

*Primary Examiner*—Michael W. Ball
*Assistant Examiner*—Barbara J. Musser
(74) *Attorney, Agent, or Firm*—Birch, Stewart, Kolasch & Birch, LLP

(57) ABSTRACT

A run-flat tire system for motorcycle improved in the puncture resistance and run-flat performance, which comprises a tire, tube and buffer; when the tire is mounted on a wheel rim and inflated, a tire cavity has a maximum section width (Wi), and when the tire is not inflated, the tire cavity has a maximum diameter (dd) and a sectional area (Sd); the buffer is an annular body made of an elastic closed-cell material disposed in the tire cavity, and a circumferentially extending groove is formed in a radially inner surface thereof to dispose the tube therein; the outside diameter (D) of the buffer under its free state is set in the range of from 0.90 to 1.0 times the maximum diameter (dd) of the cavity; the maximum section width (W) of the buffer under the free state is set in the range of from 1.05 to 1.2 times the maximum section width (Wi) of the cavity; and a gross sectional area (S) of the buffer under the free state inclusive of the sectional area of the groove is set in the range of from 1.0 to 1.15 times the sectional area (Sd) of the tire cavity.

4 Claims, 2 Drawing Sheets

RUN-FLAT TIRE SYSTEM FOR MOTORCYCLES

The present invention relates to a run-flat tire system for motorcycles, more particularly to a buffer inserted between a tire and a tube, capable of improving the resistance to puncture and the run-flat performance.

In motorcycles in particular sports bikes such as off-road bikes or motocross bikes, tires are used under a relatively low pressure in comparison with road going bikes. As a result, the engaging force between the beads of the tire and the bead seats of the wheel rim is decreased, and air leakage is liable to occur. Therefore, the tires are usually used together with a tube.

When such tire undergoes an excessive tire load, tire deformation becomes excessively large due to the low pressure, and the tread rubber sometimes collides with the rim through the tube. Therefore, if edged or pointed objects such as stones, rocks, stubs and the like exist, the tread rubber is liable to be cut therewith, and sometimes the tube is punctured.

Therefore, as countermeasures, 1) increasing the tread rubber thickness, 2) increasing the tube thickness, and 3) filling the inside of the tire with poly-urethane form instead of a tube are hitherto taken.

However, the measures 1) and 2) greatly deteriorate the steering stability and ride comfort, and it is difficult to completely prevent punctures. In the measure 3), as the poly-urethane is pressed into the tire, it is very difficult to mount the tire on the rim, and further, during running the urethane generates heat and is liable to melt down. The above-mentioned conventional tube is hereinafter called "standard tube" to distinguish from a tube used in this invention.

For the purpose of solving those problems, in the laid-open Japanese patent applications JP-A-3-231008, JP-A-3-292206 and JP-A-8-164719, we have proposed to dispose sponge rubber as a buffer to wrap the tube therein.

On the basis of those propositions, the present invention was made in order to further improve the run-flat performance and the durability of a buffer.

It is therefore an object of the present invention to provide a run-flat tire system for motorcycles, in which the durability of a buffer and the run-flat performance are improved.

According to one aspect of the present invention, a run-flat tire system for a motorcycle comprises a tire comprising a tread portion, a pair of sidewall portions and a pair of bead portions and defining a tire cavity when mounted on a wheel rim, the tire cavity having a maximum section width (Wi) when the tire is inflated to a standard pressure, the tire cavity having a maximum diameter (dd) and a sectional area (Sd) in a free state when the tire is not inflated, a buffer being an annular body made of an elastic closed-cell material disposed in the tire cavity, the buffer being provided in a radially inner surface with a circumferentially extending groove, a tube disposed in the circumferentially extending groove, the outside diameter (D) of the buffer under its free state being in the range of from 0.90 to 1.0 times the maximum diameter (dd), the maximum section width (W) of the buffer under the free state being in the range of from 1.05 to 1.2 times the maximum section width (Wi), and a gross sectional area (S) of the buffer under the free state inclusive of the sectional area of the groove being in the range of from 1.0 to 1.15 times the sectional area (Sd).

Embodiments of the present invention will now be described in detail in conjunction with the accompanying drawings.

Figure 1:
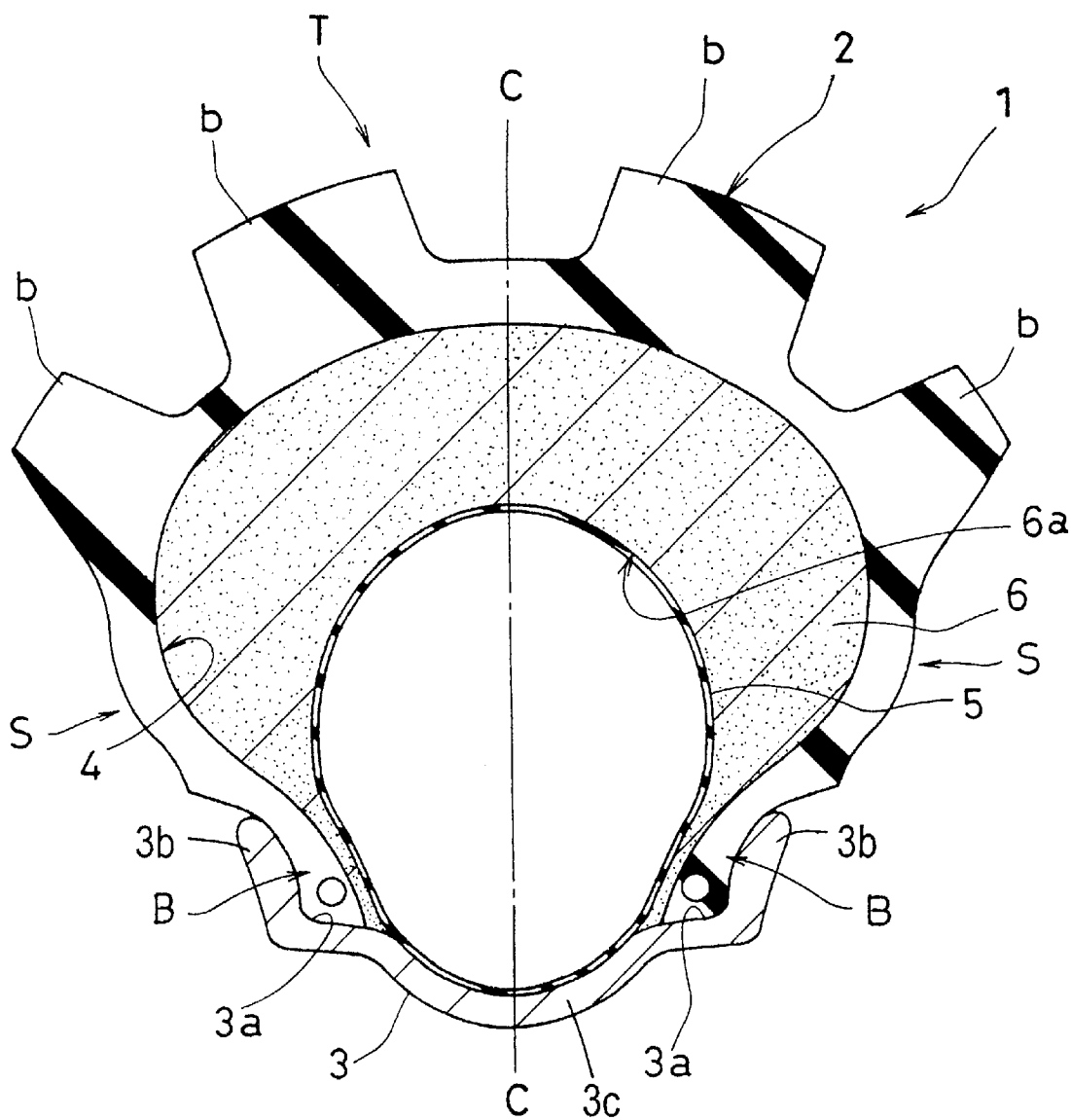
FIG. 1 is a cross sectional view of an assembly of a tire, wheel rim, buffer and tube under an inflated state showing an embodiment of the present invention.

According to the present invention, a run-flat tire system comprises a tire 2, a buffer 6 and a tube 5.

The tire 2 is a pneumatic tire for motorcycles, which comprises a tread portion T, a pair of bead portions B and a pair of sidewall portions S, and of which maximum cross sectional width lies between the tread edges. The tire has a carcass reinforced by at least one ply of organic fiber cords for example. (not shown) In this example, the tread portion T consists of blocks (b) to provide a block pattern which is suitable for off-the-road running.

Hereinafter a closed annular space 4 surrounded by the inner surface of the tire 2 and the inner surface of a wheel rim 3 when the tire is mounted on the rim 3 is called "tire cavity."

The wheel rim 3 is a standard rim which comprises a pair of flanges 3b, a pair of bead seats 3a, and a rim well 3c between the bead seats 3a. Here, the standard rim is the "standard rim" specified in JATMA, the "Measuring Rim" in ETRTO, the "Design Rim" in TRA or the like. The standard pressure which is referred to later is the "maximum air pressure" in JATMA, the "Inflation Pressure" in ETRTO, the maximum pressure given in the "Tire Load Limits at Various Cold Inflation Pressures" table in TRA or the like.

The buffer 6 is an annular body made of an elastic closed-cell material which preferably has a specific gravity of 0.1 to 0.35, and the surface has a JIS C hardness (HS) of 10 to 35 degrees, preferably 10 to 30 degrees.

As the elastic closed-cell material, preferably an expanded rubber whose expansion rate is in the range of from 400 to 1500%, more preferably 400 to 1100% is used. For the rubber material therefor, preferably, butyl rubber compounds such as butyl rubber, brominated butyl rubber, halogenated butyl rubber and the like are used. The closed-cells are formed by using a forming agent together with other additives, reinforce agents, and the like during vulcanizing.

If the expansion rate of the buffer 6 is less than 400%, the shock absorbing power decreases and the ride comfort is deteriorated. If the expansion rate is more than 1500%, the buffer 6 becomes too soft and the tire rigidity decreases. Therefore, the running stability is liable to be lost and further heat generation is liable to increase.

The buffer 6 is provided in the radially inner surface 6i with a wide and deep groove 6a extending continuously in the circumferential direction to form a hollow part in which the tube 5 is inserted. The groove 6a has a U-shaped sectional shape and the buffer 6 has a toroidal shape symmetrical about the equator C. To make the buffer 6 annular, for example, molding a material as a one-piece annular body, bending a linear material and connecting the ends thereof each other into a ring, and connecting a plurality of segments into a annular body may be possible.

The above-mentioned tube 5 is made of a gas-impermeable rubber compound with a butyl rubber base for example. The sizes, diameter and sectional area are considerably small in comparison with the standard tube.

As shown in FIG. 1, the buffer 6 is pushed into the tire 2; the tube 5 is put in the circumferential groove 6a of the buffer 6; and the tire 2 is mounted on the wheel rim 3. Then the tube 5 is inflated to a service pressure (about 0.7 to 1.5 kg/sq.cm for example). The inflated tube 5 presses the surface of the groove 6a to inflate the buffer 6, and the outside of the buffer 6 fits to and presses the inside of the tire 2, and the tire 2 is inflated into a normal service condition.

Figure 2:
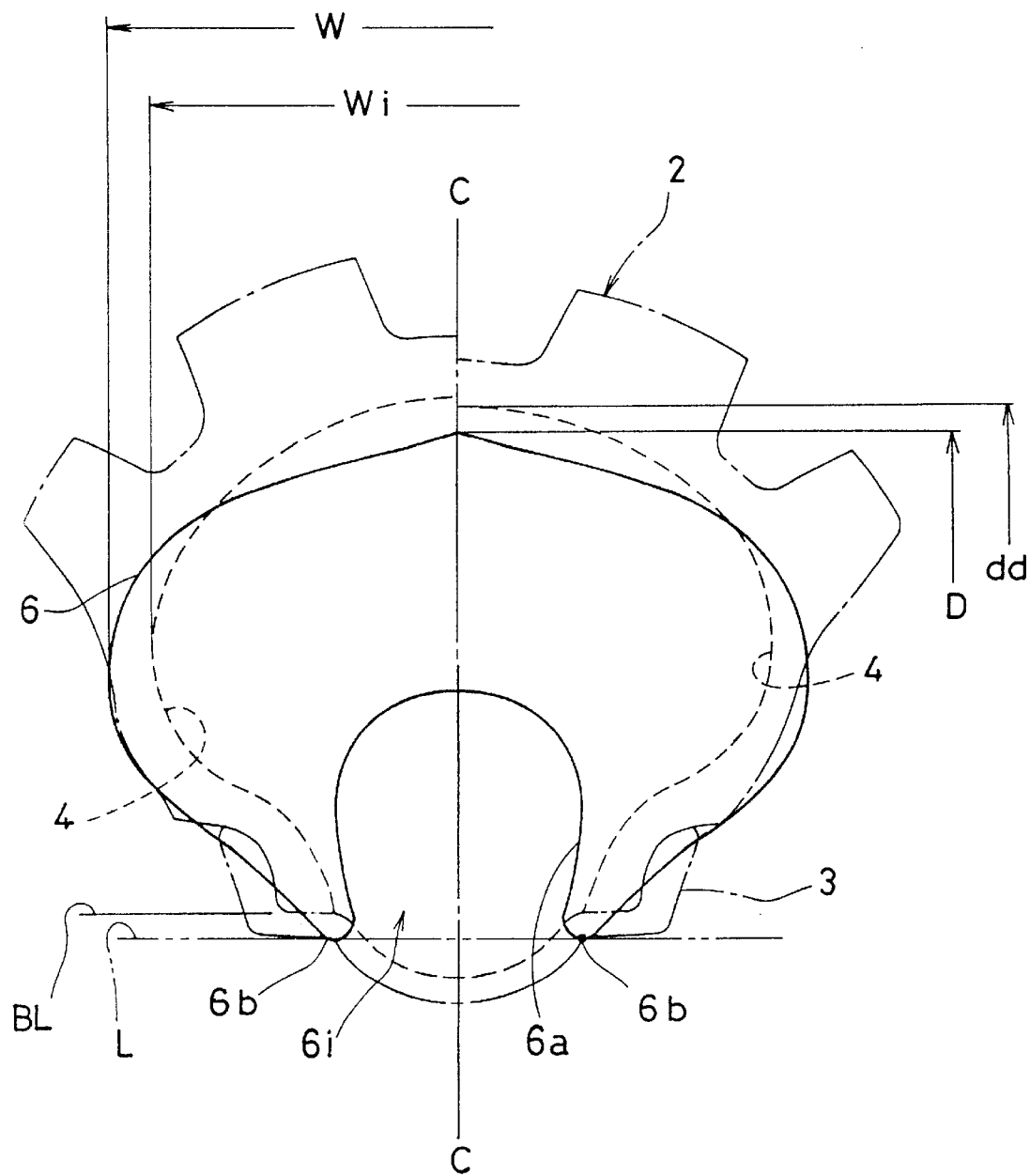
FIG. 2 shows the buffer under its free state, an assembly of the tire, rim and standard tube under a standard inflated state, and the same assembly under a non-inflated state, by overlapping each other.

As explained above, the buffer 6 is to be inserted in the tire cavity 4, but as shown in FIG. 2 the outward form thereof is deliberately differed from the inward form of the tire and rim assembly or tire cavity as shown in FIG. 2.

In FIG. 2, for easy comparison, the buffer 6 under its free state is shown, overlapping the tire and rim assembly with a standard tube. As to the assembly, shown on the right hand side of the tire equator C is a sectional shape under a non-inflated state in which the air valve of the standard tube is released, and on the left hand side of the tire equator C, the sectional shape under an inflated state in which the standard tube is inflated to a standard pressure.

The maximum outside diameter D of the buffer 6 under the free state is in the range of from 0.90 to 1.0 times, preferably 0.90 to 0.97 times the maximum diameter dd of the tire cavity 4 of the assembly under a non-inflated state (right hand side in FIG. 2). That is, D/dd is 0.90 to 1.0, preferably 0.90 to 0.97.

When D/dd is less than 0.90, the contact pressure between the buffer 6 and the tire 2 in the tread portion T is decreased if the tube 5 is punctured and the heat generation by friction therebetween increases to rise the temperature and the durability greatly decreases. When D/dd is more than 1.0, the heat generation by inner friction of the buffer insert increases and the durability tends to decrease. The maximum section width W of the buffer 6 under the free state is in the range of from 1.05 to 1.2 times the maximum section width Wi of the tire cavity 4 of the assembly under the inflated state (left hand side in FIG. 2). That is, W/Wi is 1.05 to 1.2.

When W/Wi is less than 1.05, compression of the buffer 6 becomes insufficient in the sidewall portions S if the tube is punctured. As a result, it is difficult to provide a sufficient support for the sidewall portions, which decreases the load capacity, shock absorbing power and the durability. When W/Wi is more than 1.2, heat generation is liable to increase and the durability is decreased.

The gross sectional area S of the buffer 6 under the free state is in the range of from 1.0 to 1.15 times the sectional area Sd of the tire cavity 4 of the assembly under the non-inflated state. That is, S/Sd is 1.0 to 1.15. When S/Sd is less than 1.0 or more than 1.15, the durability of the buffer 6 decreases. Here, the gross sectional area S is the total of the actual sectional area of the buffer 6 and that of the groove 6a, which is defined as the area surrounded by the outline of the buffer 6 and a straight line L drawn between the radially innermost points 6b as shown in FIG. 2.

Further, the inside diameter of the buffer 6 under the free state measured at the radially inner ends 6b is set to be smaller than the diameter at the bead base line BL of the tire or the rim diameter, thereby preventing the bead portions B from being chafed against the rim. The radically outer surface of the buffer comes to a point at the center line of the buffer.

The following table 1 shows the results of a durability test.

The durability test was made using a tire test drum. The test tire was run at a speed of 65 km/hr under a tire load of 100 kgf and the running distance was measured until abnormal vibration occurred.

Test tire: 110/90-19 motorcycle tire
Wheel rim: 19×2.15 standard rim

| Tire cavity | Non-inflated | Inflated |
|---|---|---|
| Max. Diameter (mm) | dd = 635 | di = 645 |
| Section width (mm) | Wd = 100 | Wi = 91 |

TABLE 1

| | Ex. 1 | Ex. 2 | Ex. 3 | Ref. 1 | Ref. 2 | Ref. 3 |
|---|---|---|---|---|---|---|
| Buffer | | | | | | |
| D/dd | 1 | 0.98 | 0.98 | 1.02 | 1 | 1 |
| W/Wi | 1.1 | 1.1 | 1.18 | 1.1 | 0.84 | 1.2 |
| S/Sd | 1.05 | 1.05 | 1.1 | 1.07 | 1 | 1.2 |
| Drum durability *1 | | | | | | |
| Tube pressure | | | | | | |
| 1.0 kgf/sq. cm | 3000 km A | 3000 km A | 3000 km A | 3000 km A | 3000 km A | 3000 km A |
| 0 kgf/sq. cm | 2000 km A | 2000 km A | 2000 km A | 300 km B | 200 km B | 170 km B |

*1 A = run completely without damage
B = tire was broken

From the test, it was confirmed that Examples according to the present invention could be improved in the run-flat performance and durability.

What is claimed is:

1. A run-flat tire system for a motorcycle comprising
a tire comprising a tread portion, a pair of sidewall portions and a pair of bead portions and defining a tire cavity when mounted on a wheel rim, the tire cavity having a maximum section width (Wi) when the tire is inflated to a standard pressure, the tire cavity having a maximum diameter (dd) and a section area (Sd) in a free state when the tire is not inflated,
a buffer including an annular body made of an elastic closed-cell material disposed in the tire cavity, said buffer being provided in a radial inner surface with a circumferentially extending groove,
a tube disposed in said circumferentially extending groove,
the outside diameter (D) of the buffer under its free state being in the range of from 0.90 to 1.0 times said maximum diameter (dd),
the maximum section width (W) of the buffer under the free state being in the range of from 1.05 to 1.2 times said maximum section width (Wi),
a gross sectional area (S) of the buffer under the free state inclusive of the sectional area (Sd), and
the inside diameter of the buffer under the free state being smaller than the diameter at a bead base line of the tire and the radically outer surface of the buffer comes to a point at the center line of the buffer.

2. The run-flat tire system according to claim 1, wherein the buffer has a specific gravity of 0.1 to 0.35, and the surface thereof has a JIS C hardness (HS) of 10 to 35 degrees.

3. The run-flat tire system according to claim 1, wherein the elastic closed-cell material is an expanded butyl rubber whose expansion rate is in the range of from 400 to 1500%.

4. The buffer used in the run-flat tire system as set forth in claim 1.

* * * * *